United States Patent
Weber, Jr.

(10) Patent No.: US 7,826,538 B1
(45) Date of Patent: Nov. 2, 2010

(54) REMOTE DETERMINATION OF NETWORK TRANSMITTER IDENTITY AND OUTPUT STRENGTH

(75) Inventor: John Robert Weber, Jr., Northport, NY (US)

(73) Assignee: DGI Creations, LLC, Raleigh, NC (US)

( * ) Notice: Subject to any disclaimer, the term of this patent is extended or adjusted under 35 U.S.C. 154(b) by 698 days.

(21) Appl. No.: 11/897,925

(22) Filed: Aug. 31, 2007

Related U.S. Application Data

(60) Provisional application No. 60/841,373, filed on Aug. 31, 2006.

(51) Int. Cl.
*H04L 25/00* (2006.01)

(52) U.S. Cl. .............. 375/257; 375/220; 375/377; 340/10.42; 340/825.49; 455/456.1; 455/67.11

(58) Field of Classification Search ......... 375/257–260, 375/219, 220, 377; 340/10.42, 10.2, 825.36, 340/825.49; 324/126, 509, 707; 455/456.1, 455/456.2, 456.5, 456.6, 517, 67.11, 68, 455/70
See application file for complete search history.

(56) References Cited

U.S. PATENT DOCUMENTS

| | | | |
|---|---|---|---|
| 7,069,025 B2 * | 6/2006 | Goren et al. ............. | 455/456.2 |
| 7,117,282 B1 | 10/2006 | Weber, Jr. et al. ........... | 710/107 |
| 7,242,729 B1 | 7/2007 | Heistermann et al. ....... | 375/329 |
| 7,366,773 B2 | 4/2008 | Weber, Jr. .................. | 709/223 |
| 7,519,134 B1 | 4/2009 | Heistermann et al. ....... | 375/329 |
| 2006/0028355 A1 * | 2/2006 | Patterson et al. ........ | 340/870.02 |
| 2006/0055536 A1 * | 3/2006 | Jackson ................... | 340/572.1 |
| 2008/0116877 A1 * | 5/2008 | Giubbini et al. ............... | 324/84 |

\* cited by examiner

*Primary Examiner*—Dac V Ha
(74) *Attorney, Agent, or Firm*—The Eclipse Group LLP; Kevin E. Flynn

(57) ABSTRACT

Use of power line carrier communications which introduces a high frequency analog signal onto a cable used to convey power in a portion of an electric distribution network to send a data communication received at a distant receiver through the use of pick-up coil. Changes in the power level of signals received from a remote power line carrier transmitter may indicate that the pick-up coil receiving the signal is starting to degrade. The aggregation of certain power line carrier conveyed data communications about remote transformers and related equipment may be used to look for problems in this transmitter/receiver communication network. The disclosure includes the aggregation of data communications from one transmitter received at several different power line carrier pick-up coils through the phenomenon of cross talk or through the purposeful provision of data along an alternative communication path.

2 Claims, 3 Drawing Sheets

| Vault | ID | FDR | Area | X1 | X2 | X3 | VTA | VTB | VTC | VNA | VNB | VNC | Age | R/L | Status | History |
|---|---|---|---|---|---|---|---|---|---|---|---|---|---|---|---|---|
| C | 130-C | 104 | V-DU | 030 | 030 | 030 | 124 | 123 | 124 | 124 | 123 | 124 | 000 | | | A |
| F | 130-F | 104 | V-CH | 030 | 030 | 030 | 127 | 127 | 127 | 127 | 127 | 127 | 002 | | | |
| I | 130-I | 104 | V-WP | 000 | 000 | 000 | 125 | 125 | 126 | 125 | 125 | 125 | 000 | | B | B |

| ID | Frequency | Channel | Power | Age | Channel | Power | Age | Channel | Power | Age |
|---|---|---|---|---|---|---|---|---|---|---|
| 130-C | 55 G | 04 | -046 G | 002 | | | | | | |
| 130-F | 55 G | 04 | -052 G | 000 | 08 | -088 G | 001 | 12 | -112 G | 032 |
| 130-I | 55 G | 04 | -076 G | 001 | 08 | -096 G | 005 | | | |

| ID | Frequency | Channel | Power | Age | Channel | Power | Age | Channel | Power | Age |
|---|---|---|---|---|---|---|---|---|---|---|
| 130-C | G | | | | | | | | | |
| 130-F | G | | | | | | | | | |
| 130-I | G | | | | | | | | | |

| ID /504 | Vault /508 | FEEDER /512 | AREA /516 | XM_PWR /520 | REPORT_FREQ /524 | FE_BOARD /528 | CH/F /532 | INDEX_FREQ /536 |
|---|---|---|---|---|---|---|---|---|
| 130-A | A | 112 | V-DU | -042 | 45Khz | 01 | 01 | 45Khz |
| 130-B | B | 108 | V-DU | -056 | 50Khz | 02 | 05 | 50Khz |
| 130-C | C | 104 | V-DU | -049 | 55Khz | 03 | 09 | 55Khz |
| 130-D | D | 112 | V-CH | -066 | 45Khz | 01 | 01 | 45Khz |
| 130-E | E | 108 | V-CH | -046 | 50Khz | 02 | 05 | 50Khz |
| 130-F | F | 104 | V-CH | -052 | 55Khz | 03 | 09 | 55Khz |
| 130-G | G | 112 | V-WP | -072 | 45Khz | 01 | 01 | 45Khz |
| 130-H | H | 108 | V-WP | -058 | 62Khz | 02 | 05 | 50Khz |
| 130-I | I | 104 | V-WP | -042 | 55Khz | 03 | 09 | 55Khz |

REMOTE DETERMINATION OF NETWORK TRANSMITTER IDENTITY AND OUTPUT STRENGTH

This application claims priority to and incorporates by reference herein U.S. Provisional Patent Application No. 60/841,373.

This application incorporates by reference both a related application, U.S. application Ser. No. 11/113,843 for Signal Decoding Method and Apparatus now U.S. Pat. No. 7,242,729 which describes a particular way to process the analog signal retrieved from the power line by the pick-up coil. This application incorporates by reference U.S. patent application Ser. No. 11/272,632 for Remote Monitoring of Network Protector Via Power Line Carrier and its priority document U.S. Provisional Application No. 60/627,570. This application incorporates by reference U.S. patent application Ser. No. 11/344,402 for Alternative Communication Paths for Data Sent Over Power Line Carrier. Finally, this application incorporates by reference U.S. patent application Ser. No. 11/500,713 and its priority documents for Method of Testing Remote Power Line Carrier Pick-Up Coil.

BACKGROUND

Technical Field

The present disclosure pertains to the field of data communications over power lines. This form of data communication, called power line carrier, introduces a high frequency analog signal onto a cable used to convey power in a portion of an electric distribution network. The analog signal is received at a distant receiver through the use of pick-up coil rather than risk damage by directly connect the receiver to the high voltage/high current power line cable. The present disclosure provides a way to monitor attributes of various remote components including and the ability to discern if a pick-up coil used to obtain the data conveyed by power line carrier to a power line carrier receiver is operating properly without having to de-energize the power line serving as the power line carrier in order to perform testing on the pick-up coil.

Pick-up coils to retrieve data communications from a power line carrier are well known in the art. These pick-up coils have been known in the art for years.

There is a need for a device to perform coil testing remotely, upon command as it is inconvenient to dispatch technicians to test the pick-up coils at remote and normally un-staffed locations.

The method of testing known in the art is so inconvenient and time consuming that it was rarely performed. The first step in one prior art method of testing the pick-up coils is to remove the feeder from service as the power company would not want to put a technician near a live feeder at voltages of 4 Kv to 27 Kv. So in addition to having the technicians that test the coils travel to a remote location to test the coils, the power company would need to dispatch other personnel to perform the tasks of removing the feeder from service. In order to ensure the safety of the technician, special connections are made to visibly ground the feeder wire so that the technician has a visible indication that the feeder is indeed removed from service. The safety procedures may also include formal processes to physically lock certain equipment so that the feeder cannot be energized while the technicians are working. This requirement of taking a feeder out of service by itself would make testing an inconvenient and time consuming act.

After the feeder was removed from service and grounded to ensure the safety of the technician, the technician would use a signal generator, attenuation pad, and a spectrum analyzer. As a single receiver will process the information gained by a large set of pick-up coils, the technicians first isolate a pick-up coil from the receiver. After isolating the pick-up coil, one technician applies a series of 10 to 20 test frequencies and verifies that the response from the pick-up coil at its resonant frequency is much less than at other test frequencies as this indicates that the components are operating properly. If the set of results for the set of test frequencies does not include the appropriate dip at the resonant frequency, then the pick-up coil is not operating properly.

A typical receiver might have 36 different inputs from 36 different pick-up coils. Some of these pick-up coils may actually be hundreds of feet from the receiver. To test the entire set of 36 different pick-up coils would require the application of 360 to 720 test frequencies to the wires connecting the pick-up coils to the receiver. Setting up testing equipment at up to 36 different locations around a receiver and applying a series of test frequencies to each pick-up coil is a time consuming task that might take two technicians as long as 6 hours to test a set of 36 coils, plus the time needed to isolate and ground the feeder and finally to remove the ground connections so the feeder could be placed back into service. As a power grid may have thousands of pick-up coils, the testing of an individual pick-up coil is done very rarely.

Another prior art method of testing pick-up coils does not require the feeder bus to be isolated and grounded as the pick-up coils are tested using the low voltage signal connection to the pick-up coil. While less inconvenient than removing the feeder from service, this process still requires a trip to the substation and the sequential application of test signals to each of the pick-up coils. Even this less inconvenient method of testing pick-up coils is sufficiently inconvenient that it is rarely done.

Unfortunately, the input to a receiver from a bad pick-up coil does not provide a clear indication that a pick-up coil has failed. The reason for this is the proximity of other pick-up coils frequently leads to cross talk so that a receiver is provided a set of data on the wire from a bad pick-up coil that is a duplicate of good data obtained on a functioning pick-up coil located near the failed pick-up coil. The combination of cross-talk masking bad coils and the infrequent testing makes it possible that a failed coil could remain in service for years. In some instances almost half of the 32 pick-up coils providing input to a receiver at a substation have been found to be bad upon testing. This situation was not detected much earlier as it takes the failure of a number of pick-up coils in the same general vicinity before there is not a signal to be obtained through cross-talk.

Thus, the prior art lacks a way to efficiently test pick-up coils to verify that they are operating properly rather than feeding the receiver a crosstalk signal from a nearby pick-up coil.

The '713 patent application referenced above provides a description of a set of novel testing procedures that seek to test an in-service power line carrier pick-up coil for evidence of an expected resonant behavior around a resonant frequency. The present application includes a way of discerning that a pick-up coil is no longer operating as expected without the injection of test frequencies. This method can be used either as a alternative test strategy or as a second way of testing in order to detect and verify that a problem exists with a particular pick-up coil.

The prior art also lacks a way to efficiently test pick-up coils to detect a degradation in performance so that a pick-up coil can be put on the schedule to be replaced at a convenient time before the pick-up coil degrades to the point of failure.

In addition to the need for ways to detect a failed pick-up coil, engineers and operations personnel charged with operating distribution networks, are always seeking new forms of data that allow for clues to be viewed remotely on how the network is operating or possibly to study a sequence of events to know why a network did not operate in an intended manner. Thus, there is an advantage of providing another set of data from a power line carrier receiver to aggregate data about multiple transmitters as seen through multiple pick-up coils.

For example, a test employing certain methods of injecting a test signal onto a pick-up coil that an be used to discern that the pick-up coil has degraded or failed will not necessarily discern that the pick-up coil was moved out of the way during some sort of maintenance activity and simply not put back into its proper operating position after the maintenance so that now it is not in position to obtain a strong signal. Data displayed as described below would indicate anomalous behavior that would suggest that something is wrong with the pick-up coil even in the face of test results that the pick-up coil itself is healthy.

The present disclosure addresses these shortcomings in the prior art and provides other advantages as evident from reading the description and reviewing the drawings. Particular implementations of the present disclosure may address particular shortcomings in the prior art without addressing all the shortcomings of the prior art and still be within the scope of the claims that follow. In order to avoid unduly long and repetitive disclosures, it is expected that one of ordinary skill in the art can perceive that portions of one example can be combined with portions of one or more other examples to create a new implementation has some of the desirable aspects of each of the set of examples.

SUMMARY OF THE DISCLOSURE

The present disclosure pertains to the use of power line carrier communications which introduces a high frequency analog signal onto a cable used to convey power in a portion of an electric distribution network. The analog signal is received at a distant receiver through the use of pick-up coil rather than risk damage by directly connect the receiver to the high voltage/high current power line cable. The present disclosure provides a way to monitor the receipt of information from remote power line carrier transmitters. Changes in the power level of signals received from a remote power line carrier transmitter may indicate that the pick-up coil receiving the signal is starting to degrade.

The present disclosure pertains to the aggregation of certain power line carrier conveyed data communications about remote transformers and related equipment. The disclosure includes the aggregation of data communications from one transmitter received at several different power line carrier pick-up coils through the phenomenon of cross talk or through the purposeful provision of data along an alternative communication path as described in the above referenced '402 application.

When the strongest signal from a given remote power line carrier transmitter is not the expected pick-up coil connected to the feeder bus providing service to the transformer with the power line carrier transmitter, then the network is not operating as intended. Perhaps equipment was not connected as intended. Perhaps a pick-up coil has failed and the only viable signals are coming via cross-talk. Perhaps a component on the primary communication path between the remote power line carrier transmitter and the pick-up coils connected to the power line carrier receiver is open and an alternative communication path must be used.

BRIEF DESCRIPTION OF THE DRAWINGS

FIG. 2 shows Table 200 providing data of interest with respect to several power carrier transmitters.

FIG. 3 shows Table 300 providing data about transmitters on a particular feeder.

FIG. 4 shows Table 400 providing a view of Table 300 after issuance of a Remove Feeder Command.

FIG. 5 shows Table 500 which includes the actual frequency associated with a data communication associated with a transmitter and the frequency allocated to that transmitter.

DETAILED DESCRIPTION

Figure 1:
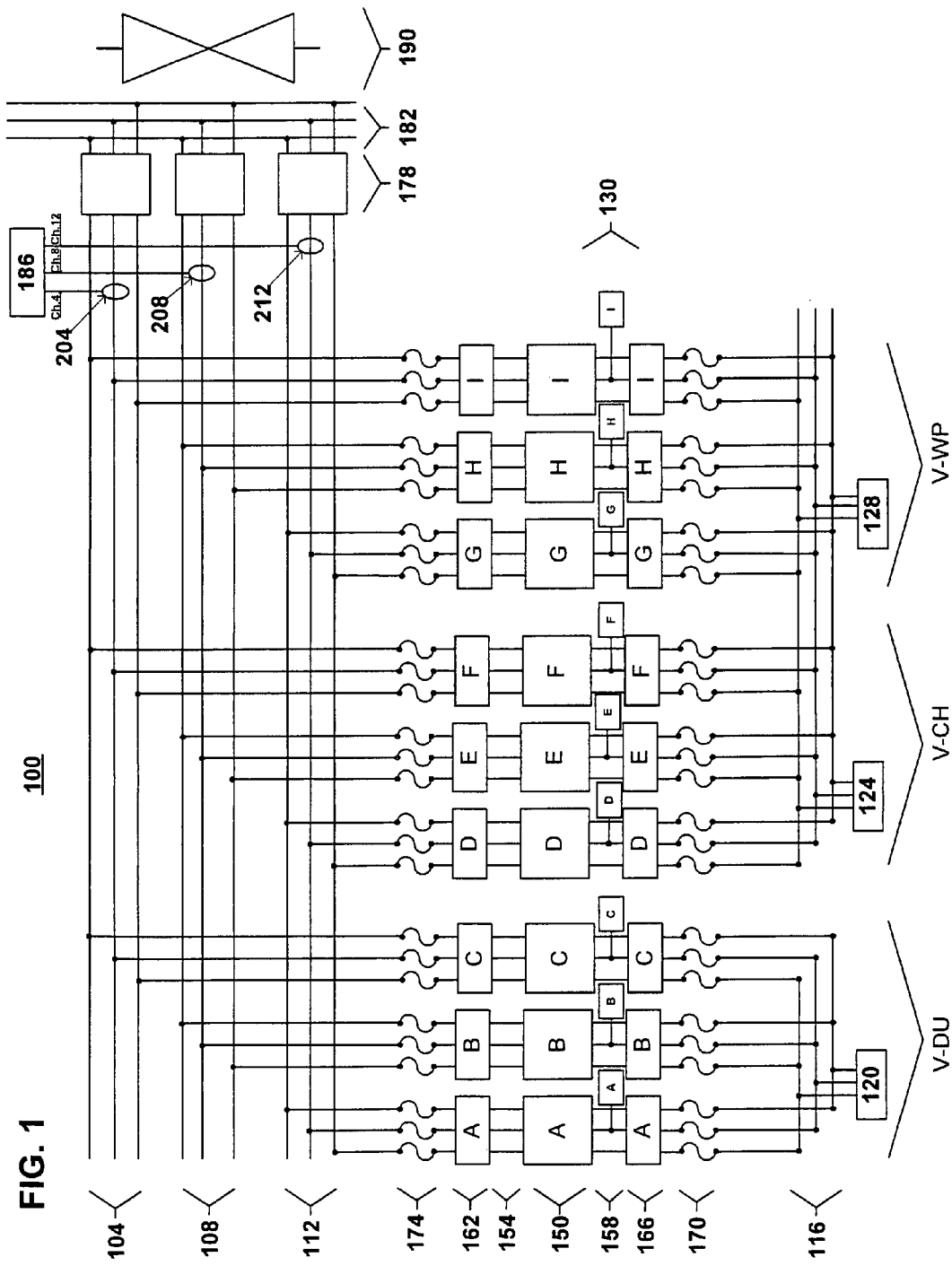
FIG. 1 is a diagram of a portion of a power distribution network that introduces various components of interest to the present disclosure.

The present disclosure will now be described more fully hereinafter with reference to the accompanying drawings, in which implementations of the disclosure are shown in order to teach the inventive aspects of the disclosure to those of skill in the art.

A simplified drawing is provided in FIG. 1 to introduce certain relevant components. As the focus of this application is on the testing the pick-up coil, many relevant components that would be present in an actual power grid distribution system have been omitted.

A portion of an electrical distribution network is shown as network 100. Network 100 has feeder bus 104, feeder bus 108, and feeder bus 112. A representative voltage for operation of these feeder buses may be 13 Kv but other systems may operate at 27 Kv, 34 Kv or some other voltage. The power on these three buses is provided to a set of local distribution networks 116 to serve loads represented by 120, 124, and 128. The voltage on these local distribution networks is apt to be 120 volts, but it could be 277 volts, 341 volts or some other voltage. In some cases these loads represent a building or even a portion of a very large building. Depending on the amount of load, the local distribution network may be coupled to one, two, or three feeder buses (104, 108, 112). Even when the load can consistently be serviced by just one feeder bus such as the spot network in area V-DU, a desire for reliability leads to providing a redundant path for providing service in case of equipment failure, scheduled maintenance, load balancing, or other needs. (FIG. 1 shows just a portion of a larger network and actual networks may have more than three possible feeder buses connected to a particular local distribution network but simplified FIG. 1 is sufficient for introducing the concepts relevant to the present disclosure.)

The local distribution networks 116 are coupled to the feeder buses 104, 108, and 112 through transformers 150 and related equipment. Nine transformers are shown in FIG. 1, as 150-A through 150-I. The transformers 150 convert the relatively higher voltage on the primary side 154 of the transformers 150 to the relatively low voltage on the secondary side 158 of the transformers 150.

The transformers 150 have breakers 162 on the primary side to isolate the transformers 150 from the feeder buses (104, 108, 112). The transformers 150 have network protectors 166 on the secondary side 158 of the transformers 150 to isolate the transformers 150 from the local distribution networks 116 as needed to protect the transformers from current flowing from the distribution networks 116 to the primary side 154 of the transformers (known as back feed).

Additionally, some networks include sets of fuse links 170 between the network protectors 166 and the local distribution networks 116. Some networks including sets of primary fuse links 174 between the breakers 162 and the feeder buses 104, 108, and 112.

The feeder buses 104, 108, and 112 are can be isolated by a set of substation breakers 178 from the substation buses 182 that are the next portion of the transmission network which is ultimately connected to a set of power sources that provide energy converted to electricity at power generators. The power sources are symbolically represented here by turbine 190.

FIG. 1 shows a small portion of the network which may have more feeder buses and many more local distribution networks 116 providing power to many more loads. These loads may be distributed around a portion of a city. The various transformers 150 may be in pits near the various loads. Thus it is convenient to inject analog signals onto the power lines so that the analog signals can be picked off by pick-up coils at the from the feeder buses at the substation and fed to a receiver 186. These analog signals are often in the frequency range of 40 kHz to 70 kHz which is much higher than the frequency of the power being distributed over the network. (For example one common frequency for power grids is 60 Hertz although other frequencies are used throughout the world and can be used in connection with the present disclosure).

U.S. Pat. No. 7,242,729 for Signal Decoding Method and Apparatus describes one system to decode information sent by phase shift keying over one of several possible carrier frequencies. While phase shift keying is a known method for increasing the information density in a data transmission, the details of phase shift keying are not relevant to an understanding of the present disclosure.

Co-pending and commonly assigned U.S. patent application Ser. No. 11/344,402 for Alternative Communication Paths for Data Sent Over Power Line Carrier sets forth alternative positions for placement of the transmitter (such as 130) and other techniques to provide alternative communication paths to allow a data record to travel from the transmitter (such as 130) to the receiver 186.

A preferred location for injecting the analog signal containing information about the operation of a transformer and related equipment is on the secondary side 158 of the transformer between the transformer 150 and the network protector 166. Transmitters 130-A to 130-I are shown in FIG. 1 to illustrate this location. Placement of transmitters 130 in this location allows for the injection of the analog signal onto the relatively low voltage, secondary side of the transformer 150. Traversing the transformer 150 from secondary side to primary side provides only a nominal attenuation of the high frequency carrier signal. A primary data path for the data on the power line carrier signal is from transmitter 130 on the secondary side 158 of the transformer 150 to the primary side 154, then through the breaker 162, primary fuse 174, feeder bus 104 (or 108 or 112), through the pick-up coils (204, 208, and 212), and ultimately to receiver 186.

One of skill in the art will recognize that the power line carrier signal could be injected on the primary side 154 of the transformer 150 but working with higher voltage bus lines is generally more cumbersome than working with the lower voltage bus line. Likewise, one could place the pick-up coil on the opposite side of the substation breakers 178.

FIG. 2 Table 200

Turning now to the examples of data tables show on FIG. 2, Table 200 has the following columns:

Vault 204—Is the utility company identifier for the actual pit (vault) where the transmitter and associated transformer are located. There may be more than one transmitter and associated transformer per vault. It can be common to have three or four transformers in a vault, but the number is commonly as high as eight or more transformers. In this example, let's assume that each of the nine transformers shown in FIG. 1 is in its own vault.

ID 208—This is the identification number assigned to the transmitter. It is a unique identifier.

FDR 212—This identifies the feeder bus (104, 108, and 112) that the primary side 154 of transformer 150 is connected to (assuming that the transformer has not been isolated from the feeder by equipment such as breakers 162 or fuses on the primary side to isolate the transformers 150 from the feeder buses (104, 108, 112).

Area 216—This is a specification that is meaningful to a particular utility. It may be a geographic area or it may be a specific portion of the distribution network. This parameter is not of critical importance to the present disclosure. FIG. 1 shows areas V-DU, V-CH, and V-WP.

X1 220 is the current on the A phase of the transformer as measured by a CT transformer located in the network protector 166. While the current could be presented as percentage of load or could be given in amps, it is usually displayed in terms of percent of the rating for that transformer. Some reports may include a "Size" field that provides the name plate rating for the transformer in KVA.

X2 224 and X3 228 are like X1 220 but reflect the measured quantities for the B and C phases.

VTA 232 is the voltage measured on the A phase of the transformer on the secondary side of the transformer. This measurement is taken on the transformer side of network protector 166.

VTB 236 and VTC 240 are like VTA except that they represent the measurements of the B and C phases of the transformer.

VNA 244 is the voltage measured on the load side of the network protector. VNA measured on the A phase. VNB 248 is measured on the B phase, and VNC 252 is measured on the C phase. Some implementations may not include both sets of voltages in every report. Some installations may only provide both sets of voltages in response to selected report requests that ask for all six voltages.

Optionally, additional analog values or digital values can be included (not shown here). For example, temperature readings associated with the transformer or the vault may be communicated.

Age 256 is the number of minutes or seconds since the last data record was received (by any route) that conveyed information from that transmitter. An implementation may place a cap on the number of minutes at some large number, for example 120 minutes, as there is no need to continue to increment this number if the signals are not reaching the receiver (such as when maintenance is being performed that adds extra grounds out in the field as a safety measure and effectively grounds the signals from the transmitter). One of skill in the art will recognize that displaying the time stamp of receipt or a portion of the time stamp of receipt (as the date and year won't be needed) would provide an adequate indication of the relative arrival times in the same way that age does. Thus, one of skill in the art could use age or a reflection of the reception time as an indication of the timestamp associated with the receipt of the data.

RL 260 is reserved for presenting the status of the network protector relay (166 A-I). The value for RL can be obtained from the network protector and conveyed by the power line carrier data communication. The value shown under RL will represent both the current state of the relay and what the relay would like to transition to. For example, calling for: float, call for trip, call for close. (The RL values are not used in the present examples)

Status 264 (sometimes called P-Status) has the status flags (if any) from the most recent data record. These status flags convey information about the network protector 166-A through 166-I associated with the power line carrier transmitter 130-A through 130-I that was the original source of the data record. The status is presented when the Network Protector is open. Some utilities use a different code, such as B to indicate that the network protector is open. The actual choice of code values is not particularly important.

When a feeder is removed from service and the network protectors are open for the transformers connected to that feeder. The X1 X2 and X3 values are apt to read zero (unless there is some measurement artifact) as they are not loaded. The voltage readings on the transformer side of the open network protector will be zero as the feeder is out of service and the transformer is not passing power. The voltages on the load side of the network protector will show normal load side bus voltages. The Status 264 will show a flag value indicating that the network protector is open.

In contrast, History 268 shows all flags since the last time the history buffer was cleared out. Often, when working with a network, the person doing diagnostics will start by emptying the history buffer so that a status flag tripped days or weeks ago does not serve as a distraction.

With this understanding of Table 200, one can discern that network protector 166-I is open but since transformer 150-I is connected to a feeder (104) that is in service, there is a non-zero voltage on either side of the network protector. As there is not a path for current from the feeder 104 to the network 116 having loads 124 and 128, the current flow through the transformer 130-I is zero on all three phases.

FIG. 3 Table 300

Table 300 is another way to view data received by the power line carrier receiver. A system may be set up to provide Table 300 in response to a command of "Present Feeder 104" where 104 is a code for a particular feeder.

The unique transmitter ID 304 is used in this table as well as in Table 200.

Frequency 308—For each transmitter, the receiver knows the frequency that was planned to be used with that transmitter. For example 55 kHz. Many power companies have a convention that they use certain colors to represent certain power line carrier frequencies. For example R for red may represent 45 kHz, B for blue may represent 50 kHz, G for green may represent 55 kHz, and y for yellow may represent 62 kHz. The display of frequency may include these color representations along with the frequency or instead of the frequency.

Channel 312—The present disclosure may be used with power line carrier receivers that are configured in a variety of ways. However, it may be useful to understand the examples presented in this application to explain that a particular receiver provided by Digital Grid could have twelve front-end boards with each front end board having two channels. Thus a receiver of this type would have 24 channels. Each channel may receive incoming data on each of the data frequencies. In one particular Digital Grid receiver, the receiver can simultaneously decode incoming signals on four different carrier frequencies on each channel. For example, data carrier frequencies of 45 kHz, 50 kHz, 55 kHz and 62 kHz. Each channel receives data from one power-line carrier coil. Each coil is placed on a different feeder (104, 108, 112). Thus each feeder may have four different transmitters (one for each carrier frequency). When working with three phase power and four carrier frequencies, each feeder can continuously convey data from 12 power line carrier transmitters continuously without having communication bus collisions.

One receiver can continuously receive transmissions from 96 transmitters (24 channels*4 carrier frequencies) without resorting to the allocation of time slots for transmission or other data bus allocation methods. In practice, there is often a reason why one or more of the data communication frequencies does not work well for a given location so that only two or three of the four data communication frequencies are used for a given location.

As many systems only use short bursts of transmitted data rather than continuous transmission from a transmitter, many transmitters can be connected to one receiver. The transmitters can be set to transmit data less frequently than after every zero crossing (120 times a second for a 60 cycle system). If each transmitter transmits during one time period between two subsequent zero crossings per minute, then that is one time slot out of 120 slots/second*60 seconds/minute or one out of 7200 time slots/minute. Thus, a system can be set up with many different transmitters transmitting onto the same phase of a feeder as long as the intervals between transmissions are not exactly the same for each transmitter so that the transmitters will not stay aligned with one another and continue to transmit during the same time slot.

As it is possible to connect many power line carrier transmitters to a particular phase of a feeder since there can be many transmitters for each power line carrier transmission frequency, an installation does not need to use all three phases of the feeder bus.

Looking closely at the tables of data (including Table 300), one will find multiple transmitters that are transmitting into the same channel (same pick-up coil) on the same frequency and relying on the low probability of two transmitters transmitting at the same time in order to get data communicated. This is part of the reason why data is sometimes not received as the receiver obtains a signal that is not useable when two transmitters are using the same zero crossing time slot and the same frequency on the same feeder. However, as the data from the transformers is usually relatively stable, waiting an extra minute or two to receive the data is not seen as a problem.

One method to avoid the problem of having two transmitters repeatedly choosing the same time slot to send out data communications on the same data communication frequency is to vary slightly the interval used in each transmitter for the interval between data communications.

System designers wishing to decrease the likelihood of data collisions can choose to increase the number of phases that are used on the feeder bus for data communication so that additional pick-up coils may be used. (Frequently, just the B phase is used as the B phase is not rolled and thus one does not need put a transmitter on A phase and a receiver on C phase).

As described above, the desire to place multiple transmitters connected to a particular pick-up coil and channel leads to repeatedly using the same data transmission frequency in one channel. (One pick-up coil and channel per phase of a given feeder). In order to minimize the data collisions, it is helpful to balance the number of transmitters per frequency/channel pair. Thus, rather than having 34 transmitters on one frequency and only 1 transmitter each of two other frequencies, it may be better to have 12 transmitters on each of the three frequencies that are to be used.

Power is expressed in decibels above a reference power. As it is a ratio of power, in different contexts, different reference levels are used. In the examples provided in this document, the dBm system sometimes called the 50 ohm system is used. Other systems use other reference levels. (For example dBj uses a 1 millivolt reference.) In the dBm system, the reference is 1.0 milliwatts. Since V=IR and W=IV, 1.0 milliwatt of power will be reflected as an approximately 0.2236 volt across the 50 ohm resistor.

In this context a decibel equals 20*log(signal strength in volts/0.2236 volts reference signal). Or alternatively, 10*log (signal in watts/1.0 milliwatt reference signal).

A signal strength above −102 dBm (slightly less than 0.1 picowatts) is generally suitable but a smaller negative number (closer to zero dBm) is a stronger signal and would be preferred.

Optionally, a representation of communication frequency can be appended to a value. For example, in Table 300, the letter G represents 55 kHz.

Age 320 is again the time in minutes (or seconds) since the last data was received on that channel for that transmitter. As noted above the age could be replace with some indication of the relevant portion of the timestamp associated with that data record. Looking down to data row for transmitter 130-I, it appears that transmitter 130-I has a signal that is being captured on several different channels. For convenience, the responses are listed in sequence by the lowest channel number. In this case channels, 04, 08, and 12 are conveying the data from transmitter 130-I. Notice that channels 04 and 08 received data within one and five minutes respectively. In contrast, channel 12 last received a signal that could be discerned over the background noise from transmitter 130-I 32 minutes ago. This is not surprising as a signal strength of −112 dBm is weaker than the lower threshold of −102 dBm.

Transmitters 130-F and 130-I are being received with reasonably strong signals on both channels 04 and 08. As power line carrier communication needs to operate in an environment with large electrical noise bursts, sometimes a signal is not readily discernible relative to the noise and is missed on a given channel.

This example helps highlight the utility in associating a unique transmitter ID 304 value in the data structure sent from the power line carrier transmitter to the power line carrier receiver as there is quite a bit of cross-talk between channels. A system that merely looked for transmitter data on a particular receiver channel and assumed that it was from a particular power line carrier transmitter could be viewing a duplicate data record via cross talk from a different transmitter reporting the conditions at the same transformer. Such a system might not notice a failed power line carrier pick-up coil or a failed power line carrier transmitter.

There are many avenues for power line carrier cross talk in a power line carrier system. Cross talk is most prevalent at the substation bus (that is 182, the secondary side of the substation transformers) (Note: the substation transformers and the primary side of those transformers are not shown in FIG. 1).

To a lesser degree there is cross talk in spot networks. A spot network can be 125V or 277V. Most of the time a spot is a 277V. The load 120 is a spot network such as a building connected to three transformers (150A, 150B, and 150C). In some cases all three transformers could be located in one transformer vault near the building.

FIG. 4 Table 400

To reduce the visual clutter from seeing many different channels that have received data for each transformer ID, a command may be given to REMOVE FEEDER DATA. FIG. 4 Table 400 shows the result immediately afterwards, Notice that the ID number 304 and Frequency 308 are shown. Received transmitter value's are blank. This is because the received frequency, channel information and signal strength has not yet been provided by a new data packet received by the receiver. The ID number and Frequency are shown in this report because in this implementation, that portion of the data record is not cleared in response to a REMOVE FEEDER DATA command. Depending on implementation choices, other parameters may be retained such as the most recent load currents, voltages, and flags such that only the channel, received frequency and signal strength data are cleared.

FIG. 5. Table 500

FIG. 5 Table 500 presents data in yet another format.

The column headings include ID 504 Vault 508, Feeder 512, and Area 516. These variables have already been discussed.

Unique transmitter ID 504—In order to avoid confusion, this should be a unique value (at least unique for the power utility or the relevant monitoring area).

Transmitter Power 520—In this summary type report, only the data from the strongest signal received is presented.

Report_Frequency 524. This is the frequency of the data record as discerned by the decoder that found the data record at this frequency. The Report_Frequency may not agree with the value stored as the expected frequency for that transmitter. While one would not expect cross talk to cause the receipt of a data record on a frequency other than the one used for transmission, the transmitter may not have been installed as originally planned. Having both the planned frequency and the actual frequency allows system planners to consider whether the transmitters were allocated to frequencies as planned. For purpose of example, the report frequency for transmitter 130-H is listed as 62 kHz but the Index Frequency is 50 kHz indicating that perhaps transmitter 130-H was not configured as planned.

Front End Board 528—This value represents the particular front end board that received the data communication. In one implementation of the present disclosure, there are two channels (two inputs from different power line carrier pick-up coils) per front end board. Other implementations may have more than two channels per front end board and it may be useful in troubleshooting to note that multiple channels on the same front end board are behaving in a particular way as that may indicate a problem with the front end board or pick-up coil.

Front End Channel/F 532—This is a field useful for those that install the communication equipment and it represents a two value tuple (pair). In a system with two channels per front end board, and four possible communication frequencies per channel, this can be abbreviated using the numbers 1-8. Thus CH/F of 01 would mean channel 1&45 kHz and CH/F of 02 would be channel 1&50 kHz, 03 would be channel 1&55 kHz, 04 channel 1 & 62 kHz, 05 channel 2&45 kHz, 06 channel 2&50 kHz, 07 channel 2&55 kHz) and a value of CH/F of 08 indicates channel 2 and 62 kHz.

Index Frequency 536—Some installations may find it useful to provide the receiver with an index of the frequencies that are allocated for use by the specific power line carrier transmitters. This index can be used as a point of comparison with the measured data as part of the verification that the network transmitters were installed with the planned transmission frequencies.

Illustrative Examples of Uses of Data

The data collected and displayed as described above is useful in a variety of situations. First, the data is useful during the installation process or after a major overhaul to ensure that transmitters are in service and the distributed over the various data communication frequencies. Transmissions that have weak signal levels on a particular frequency may indicate a problem with noise on that frequency.

Data as discussed above may be used when considering moving a portion of a network from one feeder to another. Utilities serving service areas undergoing load growth from new construction or other sources may need to reallocate certain loads and the transformers that services that load from one substation bus to another. Sometimes, this moves the power line communication from one receiver to another. Care must be taken to ensure that the transmitter ID is unique for each given receiver and that the movement of transformers and their associated transmitters does not put too many transmitters transmitting on a particular communication frequency on a given feeder bus as that may increase the incidence rate of data collisions.

Another use of the data is to provide a tool for detecting degradation or failure of a pick-up coil (204, 208, and 212). When a pick-up coil fails, the phenomenon of cross-talk is likely to mean that the channel connected to that pick-up coil will continue to receive data signals as the decoder in the receiver 186 is able to work with relatively weak signals. Likewise, data from transmitters that is intended to be received by a particular pick-up coil and conveyed to a particular channel in front-end board may continue to be received at the receiver through cross talk that leads to the receipt of a signal from that transmitter over another channel.

Assume that pick-up coil 204 shown in FIG. 1 is connected to channel 4 of the receiver 186. After a failure of the pick-up coil, all of the transmitters conveying information via pick-up coil 204 to channel 4 of the receiver 186 would be received at a weak power level if at all on channel 4 as the only way for the data signal to get to channel 4 would be cross talk to the wire between the pick-up coil 204 and the receiver 186 which would be at a lower power level than if the signal was received through a properly working pick-up coil. Any signal received on channel 4 behind a failed pick-up coil 204 would be at a lower power level than seen for that same transmitter on the channel providing the cross talk to channel 4.

For example, if cross-talk caused the signal from transmitter 130-C to show up on Feeder 108 in addition to Feeder 104, it is possible that cross talk after the failed pick-up coil 204 would put a signal onto channel 4 but the channel connected to feeder 108 (say channel 8) should get a much stronger signal than appears on 4 as there would be some attenuation of the signal as it moved across from channel 8 to channel 4. An indication of a pick-up coil failure would be that the received signal strength on a given channel that should be the primary channel (for example Channel 4 for transmitter 130-C) that is both weak and weaker than the signal received from transmitter 130-C on channel 8 or 12.

If the problem is that pick-up coil 204 has failed, then it is possible that the signal from transmitter 130-F is either not received or received strongest on a channel other than 4. Likewise the signal from transmitter 130-I would either be not received or received with greater strength on channel 8 or 12.

A receiver that did not track the channel source of the data transmission or allow for the display of the relative strength of data signals from multiple channels would not be able to provide this level of indication of a problem with pick-up coil 204.

A pattern showing that many transmitters had elevated times since the last successful receipt of data at the receiver where the common denominator is the data transmission frequency may indicate that a new noise source has been added to the system that is impairing the ability to obtain the signal over the noise from this new source. This sort of pattern is most visible when viewing data from a range of transmitters rather than looking at just the data for one transmitter.

Those skilled in the art will recognize that the methods and apparatus of the present disclosure have many applications and that the present disclosure is not limited to the specific examples given to promote understanding of the present disclosure. Moreover, the scope of the present disclosure covers the range of variations, modifications, and substitutes for the system components described herein, as would be known to those of skill in the art.

The legal limitations of the scope of the claimed invention are set forth in any claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method of monitoring transformer transmitter performance that comprises:

associating a unique identification value with a transmitter;

conveying the unique identifier value with data transmitted to a remote receiver;

storing the unique identifier along with a time stamp; an indication of the received transmission strength; and a reception channel;

selectively displaying the recently received combinations of indication of received time strength and indication regarding time stamp for various reception channels that have received transmissions associated with a particular unique identifier.

2. A method of inspecting a network of transmitters conveying data by power line carrier over a set of at least two carrier frequencies, the method comprising:

storing a set of associations between unique identifiers for transmitters and carrier frequency allocated for use by that transmitter;

receiving data communication at a power line carrier receiver;

for a data communication received at the power line carrier receiver, recording the unique identifier for the transmitter that sent the data communication along with an indication of the power level of the received data communication and the carrier frequency that was used to convey the data communication; and displaying for a particular unique identifier for the transmitter, the stored carrier frequency allocated for use by that transmitter and the carrier frequency that was used to convey data communication to the receiver that was identified as coming from the transmitter with that unique identifier.

* * * * *